United States Patent [19]

Hoskins et al.

[11] Patent Number: 4,749,214
[45] Date of Patent: Jun. 7, 1988

[54] QUICK CONNECT FLUID COUPLING

[75] Inventors: John T. Hoskins, 16 Cobblestone Court, Orchard Park, N.Y. 14127; Steven R. Zillig, 491 Harding Rd., Williamsville, N.Y. 14221; James E. Caroll, Williamsville, N.Y.

[73] Assignees: John T. Hoskins, Orchard Park; Steven R. Zillig, Williamsville, both of N.Y.

[21] Appl. No.: 777,031

[22] Filed: Sep. 17, 1985

[51] Int. Cl.4 .................. F16L 35/00; F16L 37/00
[52] U.S. Cl. ........................... 285/4; 285/39; 285/110; 285/319; 285/379
[58] Field of Search .............. 285/3, 4, 23, 39, 110, 285/319, 320, 321, 379; 277/DIG. 2, DIG. 10; 138/89, 89.4

[56] References Cited

U.S. PATENT DOCUMENTS

| 763,317 | 6/1904 | Nelson . | |
|---|---|---|---|
| 1,933,117 | 10/1933 | Markle | 285/3 |
| 2,441,344 | 5/1948 | Bosworth . | |
| 2,444,888 | 7/1948 | Baumgardner . | |
| 2,538,683 | 1/1951 | Guiler et al. | 285/379 |
| 3,221,758 | 12/1965 | Morse | 285/39 |
| 3,352,576 | 11/1967 | Thorne-Thomsen | 285/321 |
| 3,439,943 | 4/1969 | Thorne-Thomsen | 285/321 |
| 3,711,125 | 1/1973 | Dehar . | |
| 3,826,523 | 7/1974 | Eschbaugh | 285/319 |
| 3,837,687 | 9/1974 | Leonard | 285/320 |
| 3,844,585 | 10/1974 | Sands et al. | 285/3 |
| 3,847,421 | 11/1974 | Eschbaugh et al. | 285/379 |
| 4,036,515 | 7/1977 | Karcher et al. | 285/319 |
| 4,123,090 | 10/1978 | Kotsakis et al. | 285/39 |
| 4,181,329 | 1/1980 | Helm | 285/321 |
| 4,240,651 | 12/1980 | Mariaulle | 285/39 |
| 4,519,449 | 5/1985 | Hoskins et al. | 285/4 |
| 4,538,679 | 9/1985 | Hoskins et al. | 285/319 |
| 4,541,658 | 9/1985 | Bartholomew | 285/319 |

FOREIGN PATENT DOCUMENTS

| 272776 | 7/1969 | Austria | 285/39 |
|---|---|---|---|
| 1142484 | 1/1963 | Fed. Rep. of Germany | 285/3 |
| 2307154 | 8/1974 | Fed. Rep. of Germany | 285/319 |
| 982004 | 2/1965 | United Kingdom | 285/3 |

Primary Examiner—Randolph A. Reese
Assistant Examiner—Anthony Knight
Attorney, Agent, or Firm—Christel, Bean & Linihan

[57] ABSTRACT

A quick connect fluid coupling, and more particularly a quick connect fluid coupling having a minimum number of parts, which can be quickly assembled and disassembled, and which provides a good seal in an environment which is subject to vibrations and to relative motion between a fluid line and a port defining structure.

16 Claims, 5 Drawing Sheets

QUICK CONNECT FLUID COUPLING

CROSS REFERENCE TO RELATED APPLICATIONS

The present application is related to U.S. application Ser. No. 558,501 filed Dec. 6, 1983, now U.S. Pat. No. 4,519,449; U.S. patent application Ser. No. 673,043 filed Nov. 19, 1984, now U.S. Pat. No. 4,538,679; and U.S. patent application Ser. No. 677,793 filed Dec. 4, 1984, now abandoned.

FIELD OF THE INVENTION

The present invention relates generally to quick connect fluid couplings, and more particularly to a quick connect fluid coupling having a minimum number of parts, of low cost, which can be quickly assembled and disassembled, and which provides a good seal in an environment which is subject to relative motion between a fluid line and a port defining structure and which is also subject to vibrations.

BACKGROUND OF THE INVENTION

Quick connect fluid couplings are well known in the art. One form of quick disconnect fluid coupling includes a port defining structure, a fluid line, a seal disposed between the fluid line and the port defining structure, and engaging means capable of engaging the fluid line and holding it from relative movement with respect to the port defining structure, the engaging means being of such a design that the parts can be quickly assembled through a snap fit design. To this end, it is typical to provide an undercut in the port defining structure which can be engaged by the engaging means. Typical examples of such prior art designs are shown in U.S. Pat. Nos. 763,317, 2,441,344, 2,444,888, 3,711,125, and 3,826,523. Each of the prior patents mentioned above has disadvantages which have prevented these designs from gaining wide spread acceptance. Thus, for example, U.S. Pat. No. 763,317 requires a coupling sleeve which is threaded on to the port defining structure, the couplng sleeve capturing the seal between adjacent ends of the coupling sleeve and port defining structure. In addition, the engaging means of this patent is relatively complex and costly. The design shown in U.S. Pat. No. 2,441,344 overcomes many of the disadvantages of the prior design but has its own unique disadvantages. Thus, it is required to assemble a sleeve over an outwardly extending abutment on a fluid line, to then assemble a seal on the fluid line, and to then insert the parts into the port defining structure. The axial force required to be applied when assembling must be applied to the sleeve and it is possible that the sleeve could be unduly radially compressed during the application of axial force, which prevents the sleeve from engaging the undercut on the port defining structure. In addition, because of the dimensions illustrated, the fluid line may flex from side to side with respect to the port defining structure to such an extent that a good seal cannot be maintained. In addition, if the seal and sleeve were to be associated with a dunnage plug, which would be utilized to close the port defining structure prior to the insertion of a fluid line, it would be necessary to completely disassemble the seal and sleeve from the dunnage plug and to then insert them onto a fluid line before the final connection could be made. U.S. Pat. No. 2,444,888 has many of the same disadvantages of the U.S. Pat. No. 763,317 patent and U.S. Pat. Nos. 3,711,125 and 3,826,523 have many of the disadvantages of the U.S. Pat. No. 2,441,344 patent.

OBJECTS AND SUMMARY OF THE INVENTION

It is an object of the present invention to provide a quick connect fluid coupling of relatively low cost which can overcome many of the disadvantages of the prior art.

More specifically it is an object of the present invention to provide a quick connect fluid coupling wherein all parts, with the exception of the fluid line, can be associated with the port defining structure prior to the installation of the fluid line. This will permit the utilization of a dunnage plug which will not only close off the port defining structure until the dunnage plug is removed, but will also facilitate the installation of the various parts within the port defining structure.

It is an additional object of the present invention to provide a quick connect fluid coupling wherein the fluid line cannot readily be disassembled except through the utilization of relatively low cost tool.

It is a further object of the present invention to provide a novel seal which can be utilized with the subject matter of this invention, the novel seal providing a low pressure seal inserted within a port defining structure, the seal containing fluids within the port defining structure until a fluid line has been inserted through the seal.

The above objects and other objects of this invention are accomplished by providing a port defining structure having first and second bores of different diameters, there being an annular surface between the bores for the reception of a seal, a fluid line provided with an outwardly extending abutment, a seal which is adapted to be disposed between the abutment and the annular surface, and retaining means disposable between the outwardly extending abutment and a circular groove in the first bore disposed adjacent the outer surface of the port defining structure. The retaining means is provided with prongs which extend radially inwardly from a location adjacent the circular groove towards the outwardly extending abutment on the fluid line, which prongs can be biased outwardly into recess means during the insertion of the fluid line into the port defining structure and which can also be biased outwardly into the recess means by means of a cylindrical tool to permit the withdrawal of the fluid line from the port defining structure. The seal and the retaining means can be inserted into the port defining structure by initially supporting these elements on a dunnage plug and then inserting the dunnage plug, seal, and retaining means into the port defining structure, the dunnage plug forming a temporary seal until its removal. The design is such that when the dunnage plug is removed the seal and retaining means are not removed, but remain within the port defining structure. Finally, the seal can be provided with a tearable transverse membrane which can seal the port defining structure after the removal of the dunnage plug until the insertion of the fluid line.

The above objects and other objects and advantages of the present invention will be more apparent after a consideration of the following detailed description taken in conjunction with the accompanying drawings in which varying forms of this invention are illustrated.

DETAILED DESCRIPTION

Figure 1:
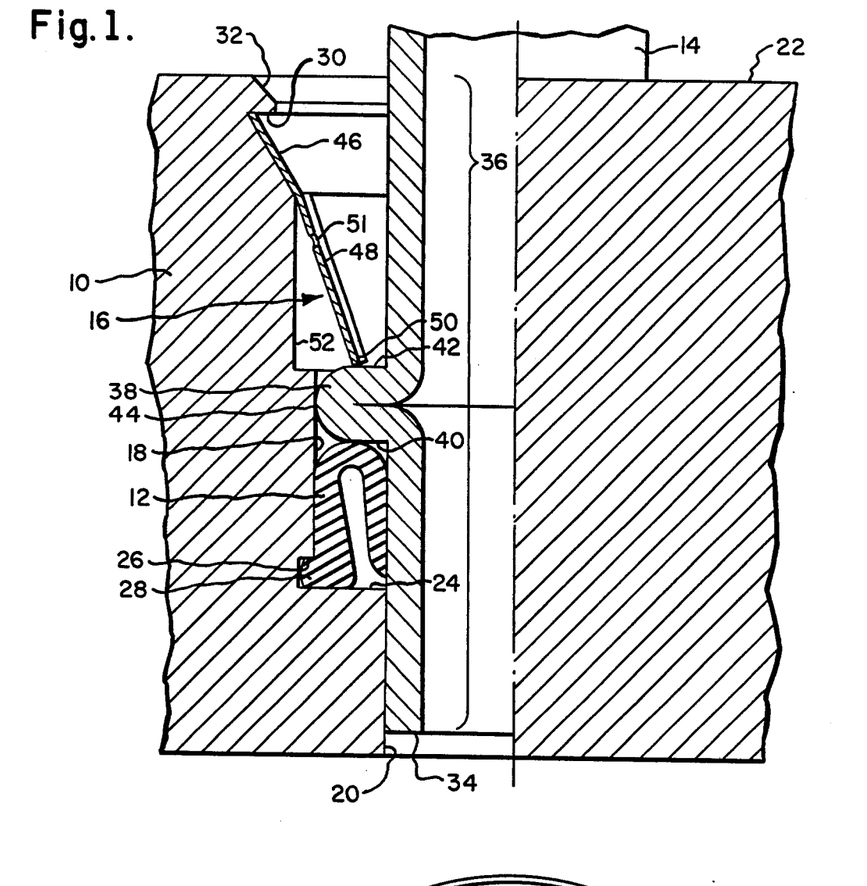
FIG. 1 is a side view partially in section of a preferred form of the quick connect fluid coupling of this invention.
Figure 2:
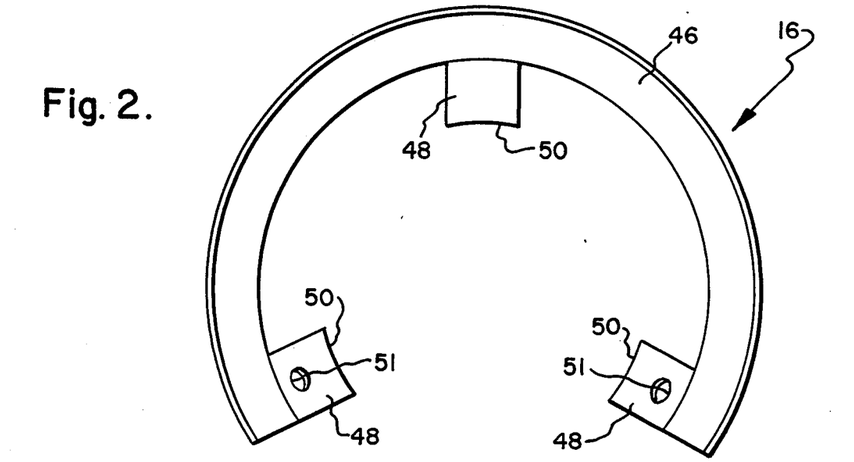
FIGS. 2 and 3 are top and side views, respectfully, of the retaining means utilized in the embodiment shown in FIG. 1.
Figure 3:
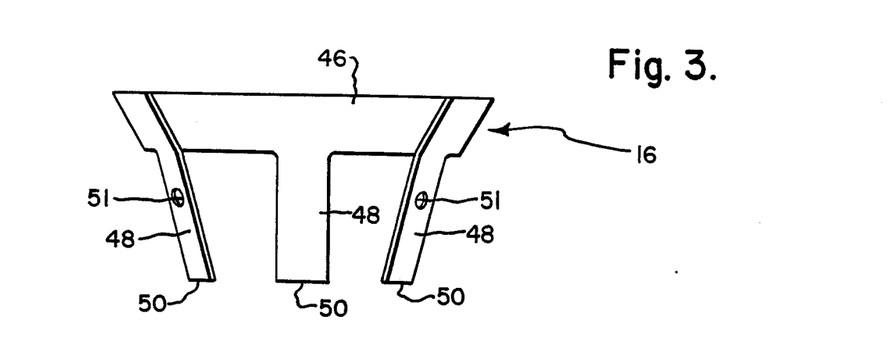

Referring first to FIGS. 1, 2 and 3 a preferred embodiment is shown in these Figs. The principal components of this embodiment are a port defining structure 10, an elastomeric seal 12, a fluid line 14, and retaining means indicated generally at 16. The port defining structure 10 could be the side wall of a transmission case, a portion of an engine block, a fitting secured to an oil cooler disposed within the header of a radiator, or other structures. In any event, the port defining structure is provided with first and second bores 18, 20, respectively, the first bore being disposed nearer the outer surface 22 of the port defining structure than the second bore. As can been seen from FIG. 1 the second bore is of a smaller diameter than the first bore. An annular surface 24 is disposed between the two bores. In addition, the first bore is undercut at 26 to provide an annular recess for a bead 28 formed on the outer peripheral of the elastomeric seal. The first bore is also provided with a circular groove 30 which, in this embodiment, is generally triangular in cross section. There is a tapered lead in surface 32 between the top edge of the first bore and the outer surface 22.

The elastomeric seal in addition to being provided with the bead 28 is of a U-shaped cross section as can also be seen from FIG. 1.

The fluid line 14 has a terminal end 34 which, when assembled, is disposed within the second bore. In the embodiment shown in FIG. 1 the terminal end extends into the second bore such a length that the second bore provides support for the fluid line. Thus, in the embodiment illustrated, the fluid line should extend into the second bore a distance at least equal to the radius of the fluid line. The end portion 36 of the fluid line, that is to say the portion of the fluid line which is disposed within the port defining structure 10, is provided with an outwardly extending abutment 38 having opposed first and second surfaces, the second surface 40 being adapted to contact the seal 12, and the first surface 42 being disposed between the second surface and the outer surface 22 of the port defining structure 10. The outwardly extending abutment 38 can be formed in a conventional manner well known in the tube making art by the utilization of upsetting dies. In any event, the outer periphery 44 of the outwardly extending abutment 38 should be so sized that it is of approximately the same diameter as the second bore 18 so that when the parts are assembled the contact between the outer periphery 44 of the abutment 38 and the bore 18 provides additional lateral stability to the fluid line.

The fluid line 14 is held in sealing engagement against the seal 12 by means of the retaining means indicated generally at 16. The retaining means in this embodiment consists of C-clip means 46 and integral resilient prongs 48 which extend downwardly and radially inwardly from the C-clip 46. The C-clip and prongs are preferably made from a resilient material such as spring steel and are so sized that the C-clip will firmly engage the circular groove 30 when assembled into the port defining structure 10. The resilient prongs are of such a length that when the C-clip is received within the circular groove 30, the free ends 50 of the prongs 48 will bear against the first surface 42 of the outwardly extending abutment 38 to hold the fluid line in firm engagement against the seal 12. The retaining means 16 is provided with suitable apertures 51 which can be engaged by a tool to compress the C-clip to facilitate its removal from the circular groove 30.

In order to provide for the assembly of the fluid line 14 within the retaining means after the retaining means has been assembled within the port defining structure, and also to provide for the removal of the fluid line, it is necessary to provide recess means which can accommodate the resilient prongs when moved radially outwardly as would happen when the end portion of the fluid line is telescoped into the port defining structure with the outer periphery 44 of the abutment bearing against the prongs. To this end, the first bore 18 is provided with a recess 52 in the form of an enlarged cylindrical cut out which is disposed above that portion of the first bore which is contacted by the outer periphery of the outwardly extending abutment 38.

Figure 4:
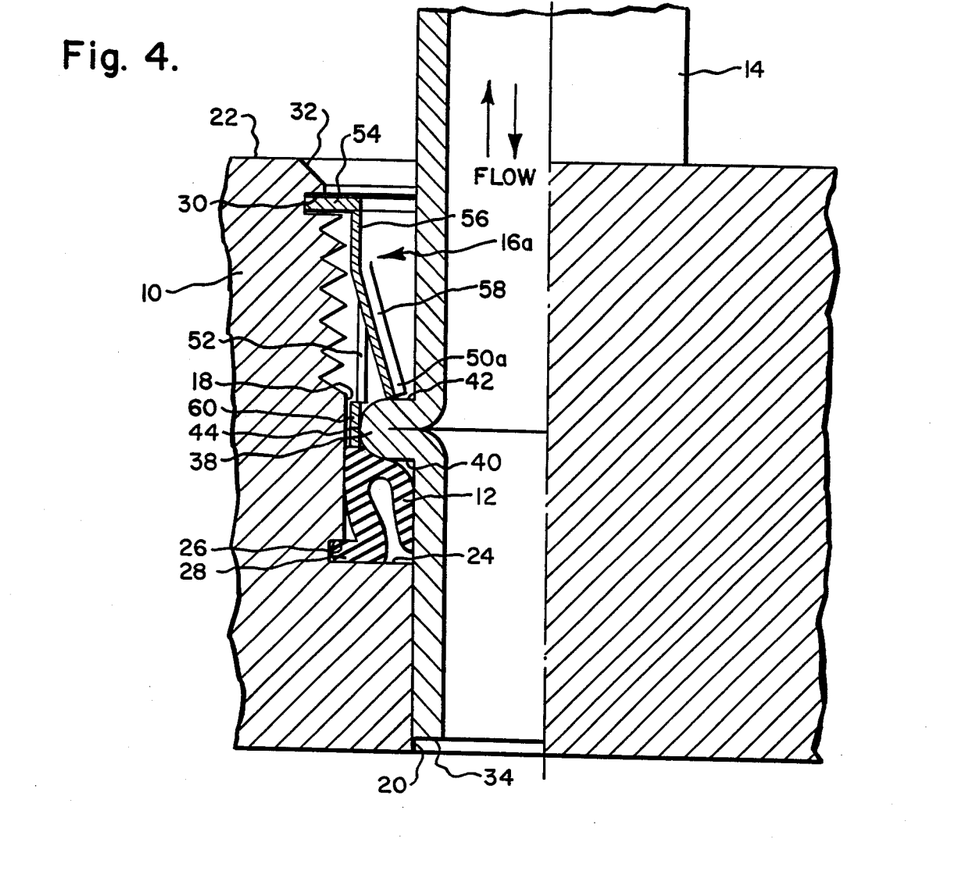
FIG. 4 is a side view partially in section of a second embodiment.

Referring now to the embodiment shown in FIG. 4, this embodiment differs principally from the first embodiment in the form of retaining means and recess means utilized. For simplicity purposes the same reference numerals will be applied to like parts however the retaining means, indicated generally at 16a, differs from the retaining means of FIG. 1. Thus the retaining means of FIG. 4 consists of two separate parts, namely a clip means in the form of a more or less conventional C-clip 54 and a separate tubular retainer 56. The tubular retainer is essentially a cylindrical member, also formed of spring steel or the equivalent, in which three generally U-shaped cutouts are provided for the formation of prongs 58, the prongs being bent inwardly to the position indicated. There is a cylindrical portion 60 of the tubular retainer below the U-shaped cutouts, and another cylindrical portion above the cutouts. The outer periphery 44 of the outwardly extending abutment bears against the lower cylindrical portion 60 of the tubular retainer 56. The recess means for receiving the prongs 58 during assembly and disassembly is the cutout, or portion, of the tubular retainer from which the prongs have been cut out. While not shown in FIG. 4, it is desirable that at least three prongs 58 be provided. While not illustrated, the C-clip 54 may be provided with apertures similar to the apertures 51 to facilitate the removal of the C-clip.

Figure 5:
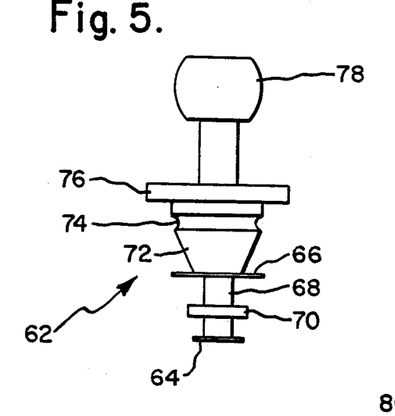
FIG. 5 is a side view of a dunnage plug which may be utilized to assemble a seal and retaining means within the port defining structure shown in FIG. 4.

Referring now to FIG. 5 a dunnage plug, indicated generally at 62 is indicated. This plug is designed for inserting the C-clip 54, the tubular retainer 56, and the elastomeric seal 12 of the embodiment shown in FIG. 4. To this end the dunnage plug includes a lower flash 64, an upper flash 66, a cylindrical portion 68 between the two flashes, and a supporting rib 70 on the cylindrical portion 68. Disposed above the upper flash 66 is a conical portion 72 which is provided with an annular recess 74 near its upper end. A flared portion 76 is disposed above the conical portion 72, and a handle 78 extends outwardly from the flared portion. The dunnage plug is preferably made of a material such as low density polyethylene so that the flashes 64 and 66 can flex when the plug is removed from the port defining structure.

The dunnage plug is utilized to assemble the seal and the retainer means within the port defining structure and to this end the seal is mounted upon the supporting rib 70 with the lower portion of the seal contacting the lower flash 64. The tubular retainer is assembled upon the conical portion with the lower ends or free ends 50a of the prongs 58 contacting the upper flash 66. The C-clip is received within the annular recess 74. After the various parts have been assembled onto the dunnage plug the dunnage plug can then be inserted into the first bore of the port defining structure until the flared portion 76 contacts the outer surface 22 of the port defining structure. At this time the bead 28 on the seal will engage the undercut 26 in the first bore and the C-ring will spring into the circular groove 30. The subassembly now formed can be shipped and the dunnage plug will act as a temporary seal during shipment to prevent the introduction of foreign material into the port defining structure and will also prevent the leakage of material out of the port defining structure. When it is desired to then insert the fluid line 14 into the subassembly the dunnage plug is simply removed and the flashes 64 and 66 will deflect away from the handle 78 when the dunnage plug is removed. While the dunnage plug illustrated in FIG. 5 is for use of the retaining means shown in FIG. 4, a similar dunnage plug can be utilized for the installation of the retaining means illustrated in FIG. 2 and in this case it will not be necessary to provide the annular recess 74.

Figure 6:
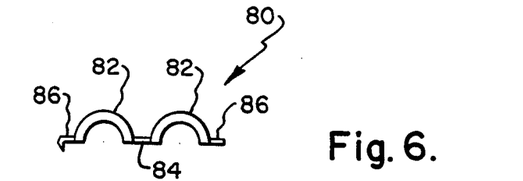
FIGS. 6 and 7 are top and side views, respectively, of a tool which may be utilized to remove the fluid line from the assembly shown in FIGS. 1, 4, and 10.
Figure 7:
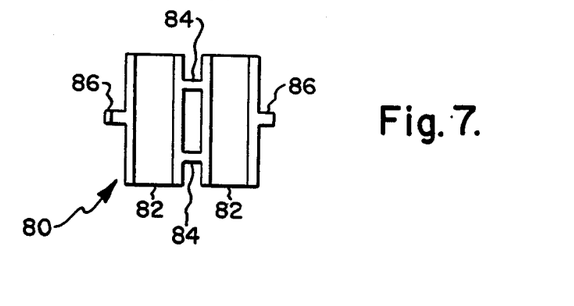
Figures 10, 11, 12:
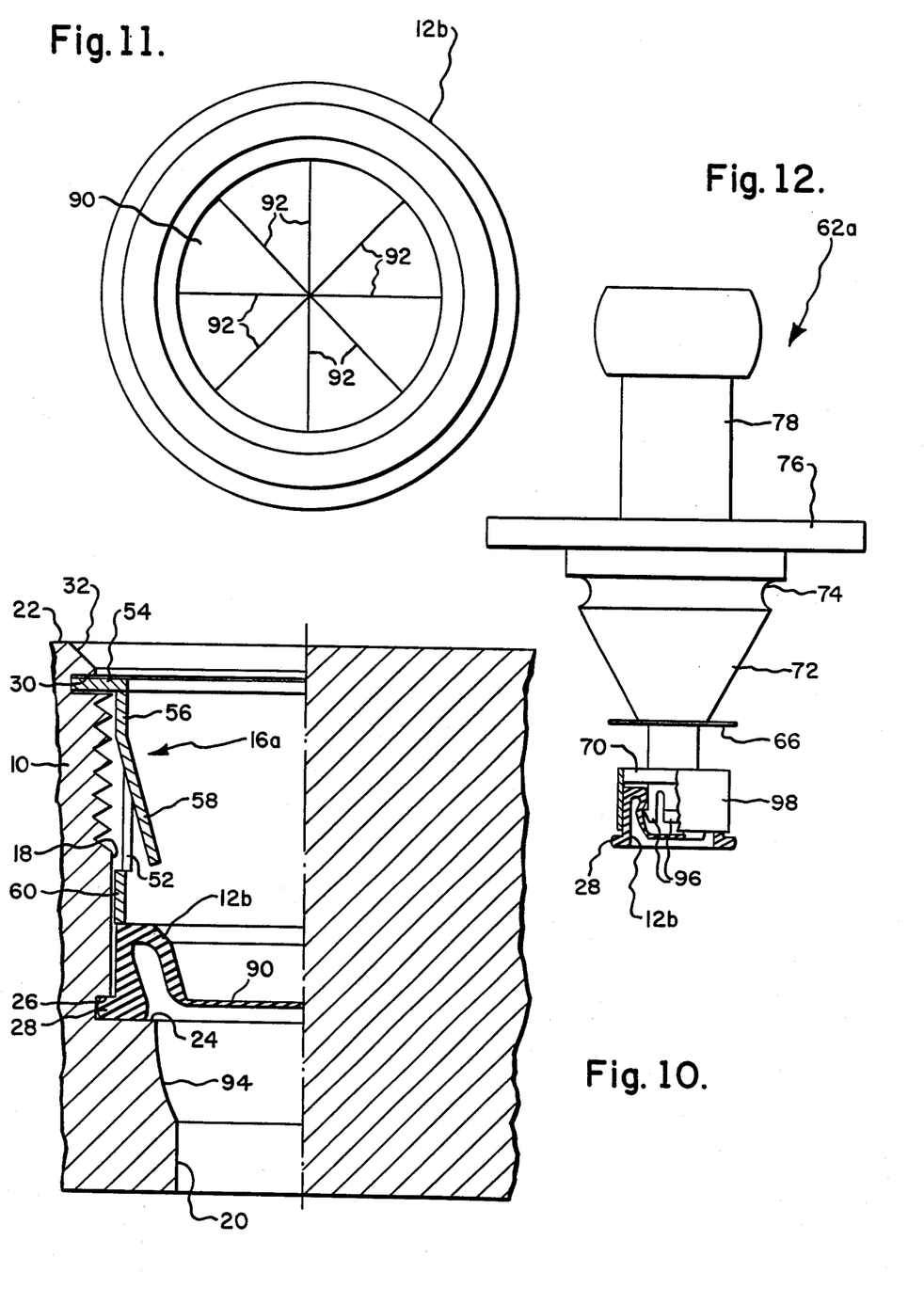
FIG. 10 is a side view, partially in section, showing another form of quick connect fluid coupling but without a fluid line, the seal shown in this embodiment having a tearable transverse membrane which will prevent fluid material from leaking out of the port defining structure after the removal of a dunnage plug.
FIG. 11 is a top view of the seal shown in FIG. 10 with the membrane unbroken.
FIG. 12 is a side view of a dunnage plug which may be utilized with the seal and retaining means shown in FIG. 10, parts being broken away and shown in section.
Figure 13:
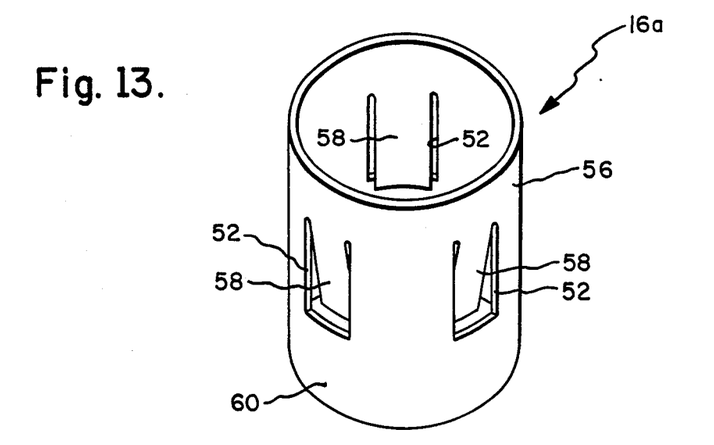
FIG. 13 is a perspective view of the retaining means utilized in the embodiments of FIGS. 4 and 10.
Figure 14:
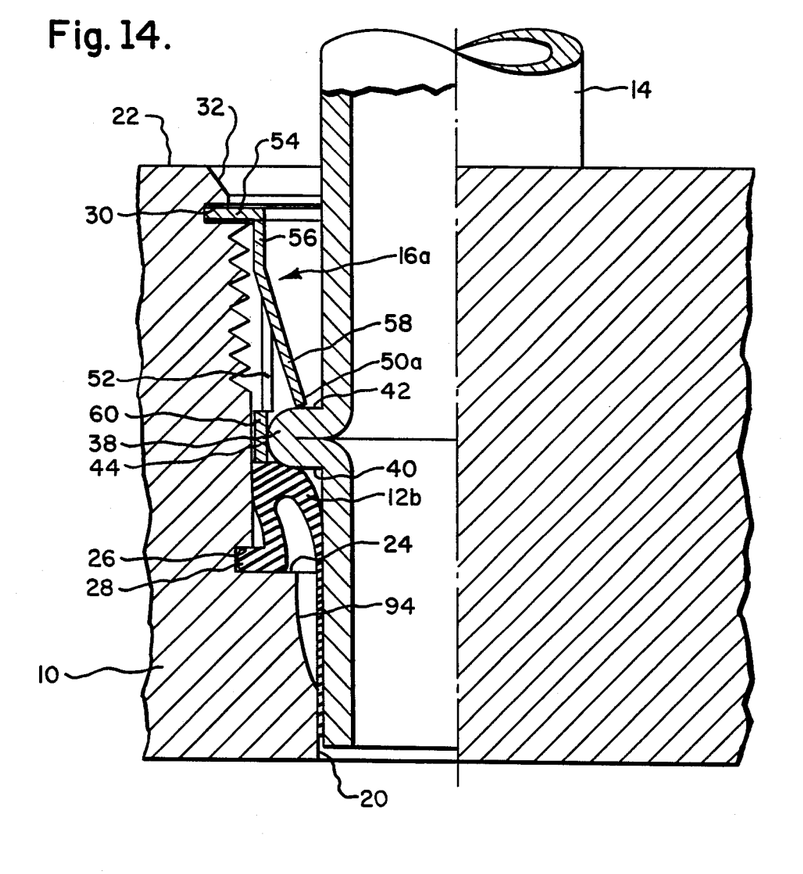
FIG. 14 is a side view showing the quick connect fluid coupling illustrated in FIG. 10 to which a fluid line has been assembled.

Referring now to FIGS. 6 and 7, a tool is illustrated which may be utilized for removing the fluid line from the assembly shown in either FIGS. 1, 4 or 10. The tool, indicated generally at 80, consists of two semi-cylindrical portions 82, 82 which are hinged together by hinges 84. The semi-cylindrical portions can be brought together to form a cylindrical element and can be held in the assembled position by latch elements 86. The tool 80 can be made of any suitable material and one such suitable material would be polypropylene. The tool 80 is utilized by closing it about the fluid line 14 and then forcing it downwardly into the cavity between the free ends of the prongs 48 or 58 forcing the prongs into the recess 52 or U-shaped cutout, at which time the fluid line and tool can be removed from the port defining structure.

Figures 8, 9:
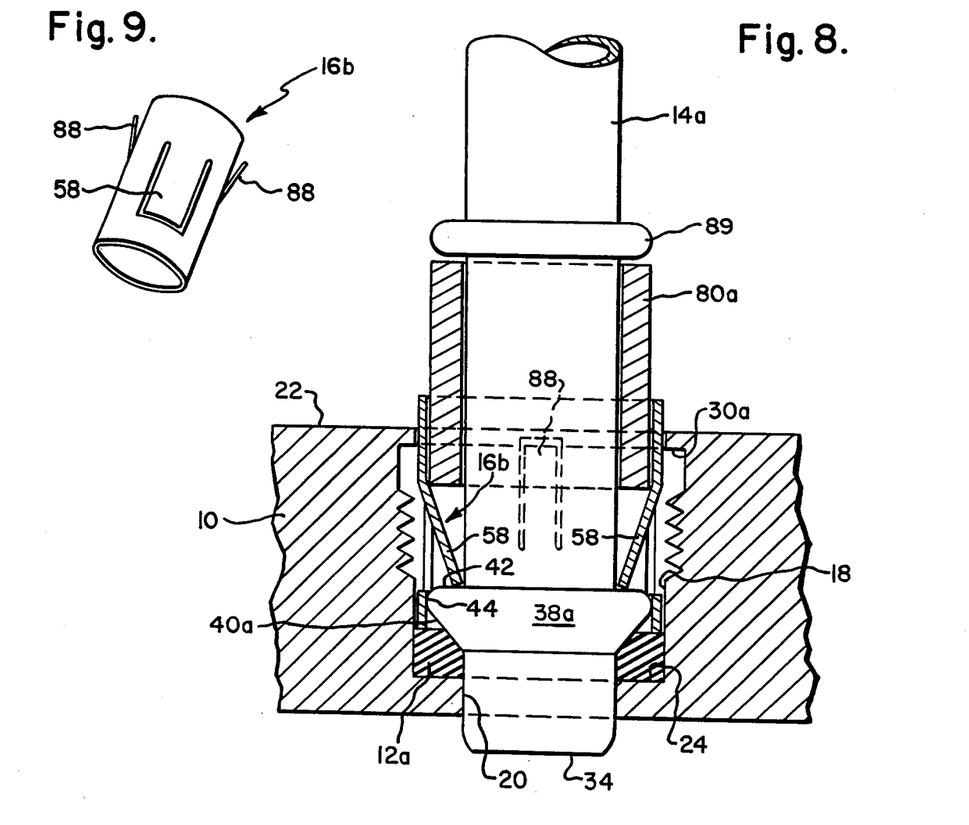
FIG. 8 is a side view of another embodiment, parts being shown in section.
FIG. 9 is a perspective view of the retaining means utilized in the embodiment of FIG. 8.

Reference will now be made to the embodiment shown in FIGS. 8 and 9. In this embodiment a somewhat differing form of elastomeric seal is utilized, the seal being indicated at 12a. In addition, a differing form of retaining means is utilized, the retaining means being indicated at 16b. A differing form of removal tool is also utilized, the removal tool being indicated at 80a. Finally, the fluid line, indicated generally 14a, is of a somewhat differing form. Referring first in greater detail to the retaining means 16b, this is of a similar form to that shown at 16a in FIG. 4 except that a C-clip is not utilized and the retaining means is provided with a second set of prongs 88, these prongs extending radially outwardly and upwardly towards the outer surface 22 of the port defining structure. When assembled, prongs 88 engage an undercut 30a which is comparable in function to the circular groove 30. The form of the retaining means can best be appreciated from an inspection of FIG. 9 wherein the retaining means is shown in perspective view. The fluid line 14a is provided with an outwardly extended abutment 38a which has a lowered angular second surface 40a which bears against the elastomeric seal 12a. The elastomeric seal is of a different construction than that shown in FIGS. 1 and 4 in that it is rectangular in cross section. It has been found that when utilizing this type of seal a better sealing surface is achieved when the surface which bears against the seal is provided with a tapered surface like that shown at 40a. The fluid line 14a is provided with a second outwarldy extending abutment 89 and a tool 80a is trapped between the first outwardly extending abutment 38a and the second outwardly extending abutment 89. The tool is simply a cylindrical sleeve and can be formed of any suitable material. It should be noted that the tool will normally be supported in the position illustrated in FIG. 8 and will provide additional lateral stability to the fluid line when assembled. It has been found that when it is not possible to provide an elongated second bore of the type shown in FIGS. 1 and 4, that it is necessary to provide additional structure to support the tube from lateral deflection, and to this end the tool 80a is utilized for providing such stability. In the event that lateral stability is not provided it is possible for the fluid line to flex and cause leakage past the seal 12a. A dunnage plug may also be utilized for assembling the seal 12a and retaining means 16b in the embodiment shown in FIG. 8.

Reference will now be made to FIGS. 10 and 11. This design corresponds generally to that design shown in FIG. 4 but a somewhat differing form of seal is illustrated. This seal is designed for applications where fluid is contained within the port defining structure and it is desirable to prevent the leakage of the fluid from within the port defining structure after the dunnage plug has been removed. To this end, the seal of this embodiment, which is indicated at 12b, is provided with a thin tearable transversely extending membrane 90. The membrane is provided with radially extending weakened portions 92 to control the tearing of the membrane and to insure that torn portions of the membrane will be retained by the seal and will not enter into the fluid line after tearing. It is further necessary to provide a recessed area 94 in the second bore for the reception of the torn membrane. After the retaining means and seal have been installed within the port defining structure to the position shown in FIG. 10 it is only necessary to insert a fluid line 14 into the port defining structure, the insertion of the fluid line causing the membrane 90 to tear along its weakened portions 92.

Reference will now be made to FIG. 12. In this Fig. a dunnage plug 62a is illustrated for the purpose of installing the seal 12b of FIG. 10. This dunnage plug differs from that shown in FIG. 5 by having a collapsible barb 96 disposed below the upper flash 66, the collapsible barb serving to support the seal during installation and permitting the removal of the dunnage plug after the installation has been completed without the removal of the seal. In addition, a skirt 98 is provided which confines the seal during insertion to insure that the rib 28 of the seal will be in alignment with the undercut 26 when the dunnage plug 62a is fully inserted within the port defining structure.

While various structures in which the principals of this invention have been incorporated have been shown and been described above, it is to be understood that the invention is not limited to the particular details shown and described above, but that, in fact, widely differing means may be employed in the practice of the broader aspects of this invention.

What is claimed is:

1. A quick connect fluid coupling comprising:
   a port defining structure having first and second generally concentric bores, the first bore extending inwardly from the outer surface of the port defining structure, and the second bore extending inwardly from the first bore and being of a smaller diameter than the first bore to provide a radially inwardly extending surface between said bores, said first bore further being provided with a circular groove disposed between and spaced away from the inwardly extending surface and the outer surface of the port defining structure;
   a fluid line having an end portion disposed within the first and second bores, the terminal end of said fluid line being disposed within said second bore, and said end portion further being provided with an outwardly extending abutment disposed between the radially inwardly extending surface and the circular groove, the abutment having axially spaced apart first and second surfaces, the second surface being disposed more closely adjacent the terminal end of the fluid line than the first surface;
   an elastomeric seal disposed in sealing relationship about the end portion of the fluid line between the second surface of the outwardly extending abutment and the radially inwardly extending surface of the port defining structure;
   retaining means assembled within the circular groove and capable of engaging the first surface of the outwardly extending abutment and retaining the end portion of the fluid line within the port defining structure, said retaining means including clip means disposed within the circular groove and a plurality of resilient prongs extending radially inwardly and away from the outer surface, the free ends of the prongs contacting the first surface of the outwardly extending abutment, said prongs being joined to each other only at their ends remote from the free ends; and
   recess means capable of receiving the resilient prongs when spread radially outwardly so that the fluid line can be assembled within the retaining means and can also be withdrawn from the retaining means for disassembly.

2. A quick connect fluid coupling as set forth in claim 1 wherein the retaining means includes a generally cylindrical member, the end of the prongs remote from their free ends being integral with the cylindrical member, and wherein the clip means is a C-clip separate from the cylindrical member.

3. A quick connect fluid coupling as set forth in claim 2 wherein the prongs are cutout from the cylindrical member along three sides, the recess means being the cutout portion of the cylindrical member.

4. A quick connect fluid coupling as set forth in claim 1 wherein the elastomeric seal is provided with a radially outwardly extending bead, and wherein the first bore is provided with an undercut adjacent the radially inwardly extending surface for the purpose of engaging the outwardly extending bead and retaining the elastomeric seal.

5. A quick connect fluid coupling as set forth in claim 1 wherein the seal is a U-section seal.

6. A quick connect fluid coupling as set forth in claim 1 wherein the retaining means includes at least three resilient prongs.

7. A quick connect fluid coupling as set forth in claim 1 wherein the clip means is a further plurality of resilient prongs extending radially outwardly and towards the outer surface.

8. A quick connect fluid coupling as set forth in claim 1 wherein the second surface of the outwardly extending abutment extends radially outwardly and towards the first surface, and wherein the elastomeric seal is generally rectangular in cross-section when in a free state.

9. A quick connect fluid coupling as set forth in claim 1 wherein the retainer means includes a cylindrical member, the resilient prongs being cutout of said cylindrical member, the recess means being the portion of the cylindrical member from which the resilient prongs were formed, and wherein the cylindrical member includes a portion disposed below the free ends of the resilient prongs and which can be contacted by the peripheral edge of the outwardly extending abutment.

10. A quick connect fluid coupling as set forth in claim 9 wherein the clip means are a further plurality of resilient prongs extending radially outwardly and towards the outer surface, said radially outwardly extending prongs being formed from said cylindrical member.

11. A quick connect fluid coupling as set forth in claim 1 further characterized by the provision of a tool for spreading the radially inwardly extending prongs outwardly to permit disassembly, the tool consisting of two semi-cylindrical members hinged together and which can be latched about the fluid line, the inner diameter of the semi-cylindrical members when latched together being only slightly greater than the external diameter of the fluid line and the external diameter of the semi-cylindrical member when latched together being slightly less than the diameter of the retaining means at the location of the ends of the prongs remote from their free ends.

12. A quick connect fluid coupling as set forth in claim 1 wherein the fluid line is further provided with a second outwardly extending abutment disposed at a location spaced away from the port defining structure, and wherein said tool is a cylinder disposed between the first and second outwardly extending abutments and capable of being engaged for movement towards the first abutment to spread said radially inwardly extending prongs outwardly to permit disassembly.

13. A quick connect fluid coupling as set forth in claim 1 wherein the plurality of resilient prongs which extend resiliently inwardly and away from the outer surface are integral with the clip means, and the clip means is in the form of a C-clip.

14. A quick connect fluid coupling as set forth in claim 13 wherein the recess means is a radially enlarged portion of the first bore, the peripheral surface of the outwardly extending abutment contacting the first bore between the radially enlarged portion and the radially inwardly extending surface.

15. A quick connect fluid coupling as set forth in claim 1 wherein the internal diameter of the clip means is greater than the external diameter of the outwardly extending abutment.

16. A quick connect fluid coupling sub-assembly comprising:
- a port defining structure having first and second generally concentric bores, the first bore extending inwardly from the outer surface of the port defining structure, and the second bore extending inwardly from the first bore and being of a smaller diameter than the first bore to provide a radially inwardly extending surface between said bores, said first bore further being provided with a circular groove disposed between and spaced away from the radially inwardly extending surface and the outer surface of the port defining structure, and said second bore being provided with a relief area adjacent said radially inwardly extending surface;
- an elastomeric seal disposed within the first bore, said elastomeric seal including an annular seal and a membrane extending across said seal, said membrane being provided with radially outwardly extending weakened portions to facilitate the tearing of the membrane when a fluid line is inserted into the port defining structure and the seal; and
- retaining means including clip means disposed within the circular groove and a plurality of resilient prongs extending radially inwardly and towards said membrane.

* * * * *